(12) United States Patent
Chappaz et al.

(10) Patent No.: US 8,205,914 B2
(45) Date of Patent: Jun. 26, 2012

(54) COUPLING ASSEMBLY FOR A FLUID-FLOW CIRCUIT

(75) Inventors: Rene Chappaz, Faverges (FR); Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 858 days.

(21) Appl. No.: 11/497,282

(22) Filed: Aug. 2, 2006

(65) Prior Publication Data
US 2007/0035129 A1 Feb. 15, 2007

(30) Foreign Application Priority Data
Aug. 10, 2005 (FR) ...................................... 05 08492

(51) Int. Cl.
*F16L 27/00* (2006.01)
(52) U.S. Cl. ........................................ 285/276; 285/316
(58) Field of Classification Search .................. 285/308, 285/276, 304, 316; 137/614, 614.04, 614.05, 137/61.064, 614.06
See application file for complete search history.

(56) References Cited

U.S. PATENT DOCUMENTS

| | | | |
|---|---|---|---|
| 2,730,382 A | | 1/1956 | Mastri |
| 3,076,671 A | * | 2/1963 | Freeman ........................ 285/277 |
| 4,388,947 A | * | 6/1983 | Steuerwald ............... 137/614.06 |
| 4,543,993 A | * | 10/1985 | Calvin et al. .............. 137/614.03 |
| 4,543,994 A | * | 10/1985 | Johnson et al. ........... 137/614.04 |
| 5,415,200 A | * | 5/1995 | Haunhorst et al. ........ 137/614.05 |
| 5,445,358 A | * | 8/1995 | Anderson ................... 251/149.6 |
| 6,283,151 B1 | * | 9/2001 | Countryman et al. ... 137/614.04 |
| 6,779,777 B2 | * | 8/2004 | Kouda ........................ 251/149.6 |
| 6,886,804 B2 | * | 5/2005 | Doi et al. ................... 251/149.6 |

FOREIGN PATENT DOCUMENTS

| | | |
|---|---|---|
| FR | 2247662 | 5/1975 |
| FR | 2707603 | 1/1995 |
| FR | 2708078 | 1/1995 |
| GB | 865002 | 4/1961 |
| GB | 1482197 | 8/1977 |

\* cited by examiner

*Primary Examiner* — Michael P Ferguson
*Assistant Examiner* — Gwendolyn Driggers
(74) *Attorney, Agent, or Firm* — Dowell & Dowell, PC

(57) ABSTRACT

A coupling assembly including an endpiece defining a fluid flow passageway and being adapted to be secured to an outlet of a fluid-flow circuit, and a coupling member including a body defining at least one housing for receiving locking balls, a slider defining an axial wall of the at least one housing, a control member surrounding the body and slider and being provided with a ball-locking element that is movable between a rest position in which it and the slider, in an advanced position thereof, retain the locking balls in an innermost locking position, and a release position wherein the slider is movable to allow the locking balls to move both linearly and outwardly to an unlocked position thereof, and return elements for returning the control member to its rest position.

14 Claims, 4 Drawing Sheets

COUPLING ASSEMBLY FOR A FLUID-FLOW CIRCUIT

BACKGROUND OF THE INVENTION

1. Field Of The Invention

The present invention relates to a coupling assembly for a fluid-flow circuit.

In the meaning of the invention, such a fluid flow circuit is particularly, but not exclusively, a hydraulic circuit for a motor vehicle, in particular a competition vehicle. The above-mentioned hydraulic circuit is constituted, for example, by a brake circuit or a cooling circuit. Nevertheless, the invention is applicable to types of fluid-flow circuit other than those mentioned above, and in particular to those forming part of machines for injecting plastics materials.

The coupling assembly in accordance with the invention allows these various types of fluid-flow circuit to be treated, in particular to be filled with fluid, cooling liquid or brake liquid, or else to be closed. The coupling assembly also makes it possible to verify at least one characteristic relating to the fluid, in particular its pressure.

2. Brief Description Of The Related Art

FR-A-2 707 603 discloses a safety plug suitable for co-operating with an endpiece for filling a tank with fluid under pressure. The plug comprises a body associated with a sliding ring for moving locking balls radially.

That known arrangement nevertheless implies certain drawbacks. The plug turns out to be relatively inconvenient to put into place, insofar as it requires the body to be pushed back while simultaneously pulling on the control ring.

FR-A-2 708 078 discloses a safety cutout for an installation for handling fluids under pressure. The cutout comprises two elements, one male and one female, that are secured to the ends of two portions of pipework, respectively connected to a source of pressure and to a tank of a vehicle, for example. Coupling and uncoupling are performed respectively by pushing and by pulling on the above-specified male and female elements.

That device also presents certain drawbacks. Given that it is a safety device intended to prevent the feed pipe being pulled away in untimely manner by the vehicle, it requires high levels of disconnection force, such that it does not lend itself easily to everyday handling. In this respect, it should be observed that if that device could be handled using small forces, that would lead to major risks of accidental disconnection.

OBJECT AND SUMMARY OF THE INVENTION

That said, the invention seeks to provide a coupling assembly comprising an endpiece and at least one complementary member suitable for being coupled to and uncoupled from said endpiece, in a manner that is simple and natural for an operator.

To this end, the invention provides a coupling assembly for a fluid-flow circuit, the assembly comprising an endpiece suitable for being secured to an outlet of said circuit, said endpiece being provided with means for receiving locking elements, in particular locking balls, said coupling assembly also comprising a coupling member suitable for co-operating with said endpiece, said coupling member comprising:

a body;

at least one housing formed in the body for receiving said locking elements, which elements are movable between a locked position that is radially inner relative to a main axis of the body, and an unlocked position that is radially outer relative to said axis;

a slider defining an axial wall of said housing, said slider being movable between an advanced position in which it imparts a small axial size to said housing and in which the locking elements are blocked in their locking position by a locking element, and a retracted position in which the slider imparts a larger axial size to said housing;

a control member provided with said locking element and movable between an active position in which it entrains the slider into its advanced position, and a released position in which it comes into abutment against an end of the body that in use faces towards the endpiece; and return means for returning the control member towards its released position, which return means are interposed between facing walls belonging respectively to the body and to the control member.

According to other characteristics of the invention:

the return means of the control member are resilient return means, and comprise in particular at least one return spring;

it is further provided with return means for returning the slider into its advanced position;

the return means for the slider are interposed between facing walls of the slider and the control member;

the return means of the control member and the return means of the slider are in alignment with each other;

the return means of the control member and the return means of the slider are of resilient nature, the stiffness of the return means of the control member being considerably greater than the stiffness of the return means of the slider;

the control member is provided with a middle rib projecting radially inwards, the return means for said control member being interposed between said rib and a facing shoulder formed on the body of the coupling member, while the return means for the slider are interposed between said rib and the slider;

the endpiece has a movable valve member suitable for being moved by a stationary portion of the coupling member, while the coupling member possesses a movable valve member suitable for being moved by a stationary portion of the endpiece;

when the endpiece and the coupling member are separated, their respective stationary portions and their respective movable valve members together define respectively in the endpiece and in the coupling member complementary volumes having facing surfaces suitable for bearing flat one against another; and said coupling assembly further comprises a plug suitable for co-operating with said endpiece instead of the coupling member, the plug comprising:

a body having a closed end wall, that is remote in use from the endpiece;

at least one housing formed in the body, the housing serving to receive the locking elements that are movable between a locked position, radially towards the inside of the housing, and an unlocked position, radially towards the outside of the housing;

a slider defining an axial wall of the housing, said slider being movable between an advanced position in which it imparts a small axial size to the housing, and in which the locking elements are locked in their locked position by a locking element, and a retracted position in which it imparts a larger axial size to the housing;

a control member provided with the locking element, which control member is movable between an active position in which it entrains the slider into its advanced position, and a released position in which it comes into abutment against an end of the body that faces towards the endpiece in use; and return means for returning the control member into its released position, which return means are interposed between the facing walls of the body and of the slider.

BRIEF DESCRIPTION OF THE DRAWINGS

The invention can be better understood and other advantages thereof appear more clearly in the light of the following description of an embodiment of a coupling assembly in accordance with the principle of the invention, given purely by way of non-limiting example and made with reference to the accompanying drawings, in which.

DESCRIPTION OF THE PREFERRED EMBODIMENT

Figure 1:
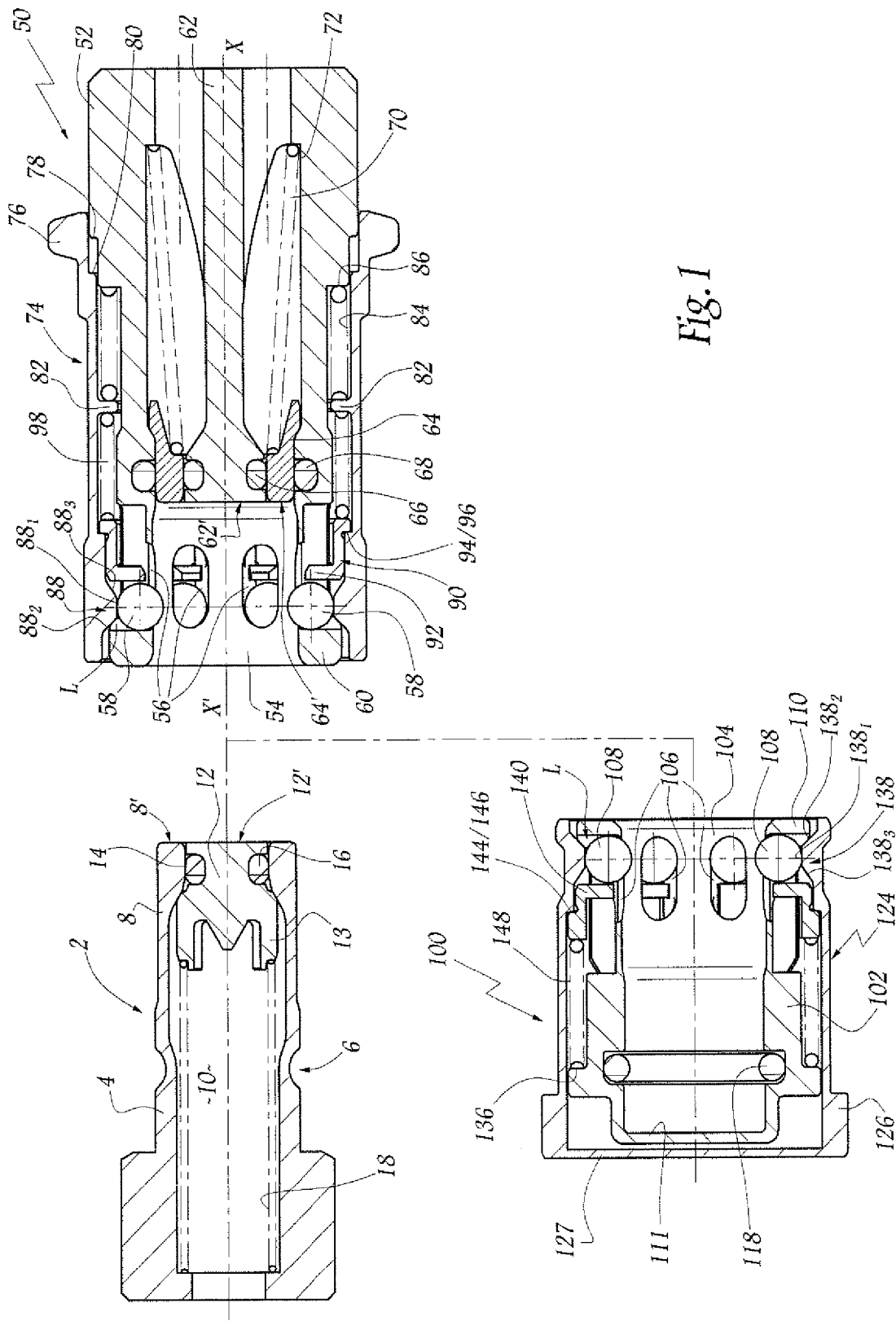
FIG. 1 is a side view showing the various component elements of a coupling assembly in accordance with the invention, shown in isolation from one another.

The coupling assembly in accordance with the invention, shown in FIG. 1, comprises firstly an endpiece 2 for securing by any suitable means to the outlet (not shown) of a fluid-flow circuit. By way of non-limiting example, the circuit may be a hydraulic circuit in a motor vehicle, in particular a competition vehicle, or it may be a cooling circuit for an injection molding machine, or for electronics cards, in particular for a rail vehicle.

The endpiece 2 includes a cylindrical body 4, having formed therein a peripheral groove 6. It should be observed that the end wall, front face or free end 8' of the body 4, situated to the right in FIG. 1, i.e. at the coupling end of the endpiece, present an outer generator line that is rectilinear and parallel to the main axis of the endpiece.

The hollow body 4 defines a through housing or passageway 10 in which there is received a valve member 12, housed against the walls of a neck 14 with a peripheral gasket 16 interposed therebetween. In conventional manner, the valve member 12 possesses end fingers 13 defining a fluid passage when in the open position, as described in greater detail below. Finally, a spring 18 is provided suitable for urging the valve member 12 against its seat, i.e. against the walls of the neck 14.

References 8' and 12' designate the respective front faces of the body 4 and of the valve member 12, i.e. faces that, in operation, face towards the complementary member that is to co-operate with the endpiece. In the arrangement of FIG. 1, these front faces 8' and 12' are generally coplanar, while being perpendicular to the main axis of the endpiece.

The coupling assembly in accordance with the invention, as shown in FIG. 1, also comprises a coupling member given overall reference 50. This member 50 comprises a hollow body 52 that receives a likewise hollow bushing 54 on its end facing towards the endpiece 2. The bushing 54 is pierced by a plurality of elongate slots 56 along which locking balls 58 are capable of sliding. The bushing 54 is provided with an end ring 60 facing towards the endpiece 2 and projecting radially outwards.

The coupling member 50 is provided with a central branch 62 extending on the main axis X'-X of said coupling member. At its end facing towards the endpiece 2, the branch 62 is surrounded by a valve member 64 with an inside gasket 66 being interposed therebetween. An outside gasket 68 is also provided interposed between the valve member 64 and the inside periphery of the body 52.

References 62' and 64' designate the respective front faces of the branch 62 and of the valve member 64, i.e. their faces facing towards the endpiece 2. In the arrangement of FIG. 1, these faces 62' and 64' are generally coplanar, extending perpendicularly to the main axis X'-X of the coupling member 50.

In the closed position shown in FIG. 1, the valve member 64 is in abutment against the bushing 54. A spring 70 is also provided having a first end pressing against the valve member 64 and having its other end resting against a shoulder 72 of the body 52. As explained in greater detail below, the spring 70 is suitable for urging the valve member 64 into its closed position, i.e. into abutment against the bushing 54.

A control sleeve 74 is slidably mounted on the outer periphery of the body 52. At its end situated to the right in FIG. 1, i.e. its end remote from the endpiece 2, the sleeve 74 possesses a drive collar 76 projecting radially outwards. Two shoulders, a shoulder 78 formed on the body 52, and a shoulder 80 formed on the sleeve 74, serve to limit the stroke of the sleeve 74 relative to the body 52. The sleeve is also provided with a peripheral rib 82 projecting radially inwards and receiving the first end of a return spring 84, having its other end bearing against an additional shoulder 86 formed at the periphery of the body 52.

At its end remote from the collar 76, the sleeve 74 possesses a frustoconical projection 88 extending radially inwards and suitable for co-operating with the balls 58. More precisely, this projection 88 possesses a locking land $88_1$ with two inclined lateral ramps $88_2$ and $88_3$ on either side thereof, facing respectively towards the endpiece 2 and away therefrom.

Finally, the coupling member 50 includes a slider 90 that is axially movable relative to the body 52. This cylindrical slider possesses a margin 92 projecting radially inwards, and a shoulder 94 situated at the end of the slider 90 that is remote from the endpiece 2. The shoulder 94 is suitable for coming into abutment against an additional shoulder 96 formed facing it on the control sleeve 74. This shoulder 94 also receives the first end of a return spring 98 whose other end comes to bear against the rib 82 of the sleeve 74.

It should be observed that the second spring 98 is not as strong as the first spring 84, as can be seen more clearly from the description below of the coupling stage. It should also be emphasized that these two springs 84 and 98 extend in line with each other, which is advantageous in terms of overall radial size of the coupling member 50.

Finally, it should be observed that the housing L for receiving the balls 58, is defined by the facing walls belonging respectively to the margin 92 of the slider 90, to the projection 88 of the sleeve 74, and also to the ring 60 of the bushing 54. As explained in greater detail below, the axial dimensions of this housing L can be varied.

The coupling assembly shown in FIG. 1 also comprises a plug 100 suitable for co-operating with the endpiece 2 instead of the coupling member 50. This plug 100 possesses a structure that is generally analogous to that of the coupling member 50. As a result, the mechanical elements of this plug that correspond to mechanical elements of the coupling member are given the same reference numbers, plus 50.

The plug 100 thus comprises a body 102 fitted with a bushing 104 having elongate slots 106 formed therein for receiving locking balls 108. The body 102 is also provided with a peripheral ring 110 facing towards the endpiece 2.

Unlike the coupling member 50, the hollow body 102 of the plug 100 has a closed end wall 111 in the vicinity of which there is provided an O-ring 118. The body 102 is surrounded by a control sleeve 124 fitted with a drive collar 126. Unlike the sleeve 74, the sleeve 124 fitted to the plug 100 also possesses a closed end wall 127, extending in the vicinity of the end wall 111 belonging to the body 102.

The ring 124 is provided with a projection 138 possessing a locking land $138_1$, and two lateral ramps $138_2$ and $138_3$. A slider 140 is also provided that possesses a shoulder 144 suitable for co-operating with a complementary shoulder 146 formed on the sleeve 124. The slider 140 is moved against a return spring 148 interposed between the slider 140 and an additional shoulder 136 formed on the body 102.

There follows a description of how the above-described coupling is used, in particular a description of the co-operation between the endpiece 2 and the coupling member 50.

In the uncoupled position, as shown in FIG. 1, the spring 18 urges the valve member 12 of the endpiece 2 into its closed position, i.e. bearing against the walls of the neck 14. In addition, the spring 70 fitted to the coupling member 50 urges the valve member 64 into its closed position, bearing against the bushing 54. The spring 84 urges the sleeve 74 towards the endpiece 2 such that the lateral ramp $88_2$ of the projection 88 comes into abutment against the facing walls of the ring 60. Furthermore the spring 98 urges the slider 90 against the sleeve 74, such that the respective shoulders 94 and 96 are in abutment one against the other.

Under such conditions, the housing L possesses minimum axial dimensions. Consequently, the balls 58 possess substantially no room for moving axially, so they are held in place by the land $88_1$ of the projection 88. These balls 58 are thus in their radially retracted position.

Figure 2:
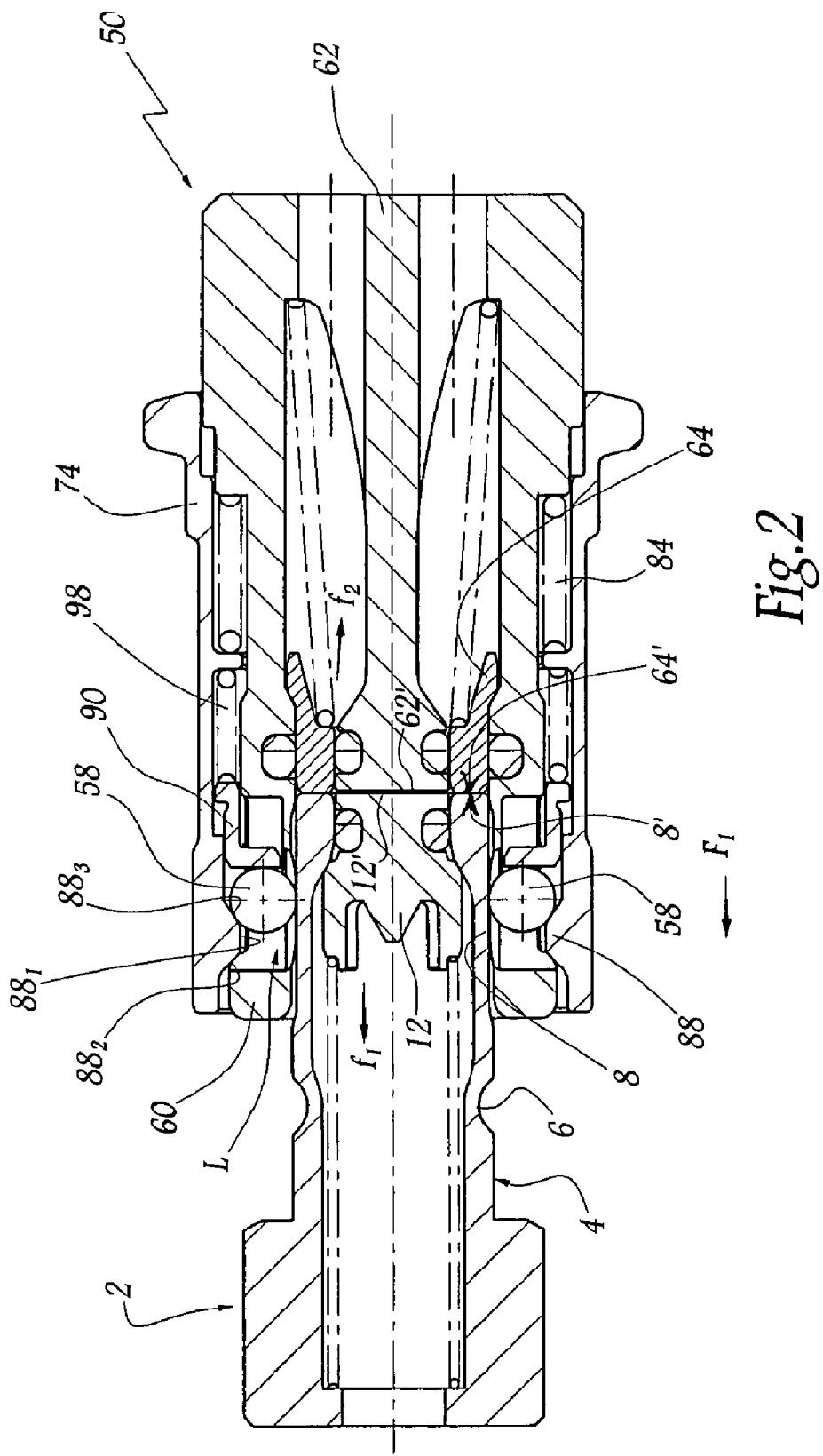
FIG. 2 shows the stage of coupling together an endpiece and a coupling member forming parts of the FIG. 1 coupling assembly.

FIG. 2 shows the stage of coupling the coupling member 50 relative to the endpiece 2. For this purpose, the coupling member 50 is brought up to the endpiece 2 along arrow $F_1$, i.e. towards the left in FIG. 2. This operation can be performed by pushing either against the sleeve 74 or against the body 52.

Under such conditions, the free end 8' of the body 4 of the endpiece 2 comes into contact with the locking balls 58 so as to cause them to move away from the ring 60. The balls then cause the slider 90 to move against the spring 98, but without moving the sleeve 74 or its projection 88, in particular when the coupling member 50 is being pushed via the body 52. As mentioned above, the spring 84 is stronger than the above-mentioned spring 98.

The balls 58 thus run along the inside surface of the sleeve from the land $88_1$ towards the ramp $88_3$ of the projection. Under such conditions, the balls then occupy a radially outer position, while the housing L takes on axial dimensions that are greater than those it presented when in the uncoupled position of FIG. 1. In this respect, it is emphasized that the balls 58 possesses two degrees of freedom relative to the body of the coupling member 50, not only in a radial direction, but also in an axial direction.

It is then possible to cause the end walls 8 of the body 4 to slide along the balls 58, since they are in their radial outer position. Then, the body 4 of the endpiece 2 comes into contact with the valve member 64 of the coupling member 50, while the central branch 62 of said member 50 comes into contact with the valve member 12 of the endpiece 2. This leads to relative displacement between the two valve members, i.e. the valve member 12 moves towards the left along arrow $f_1$, while the valve member 64 moves to the right along arrow $f_2$.

Figure 3:
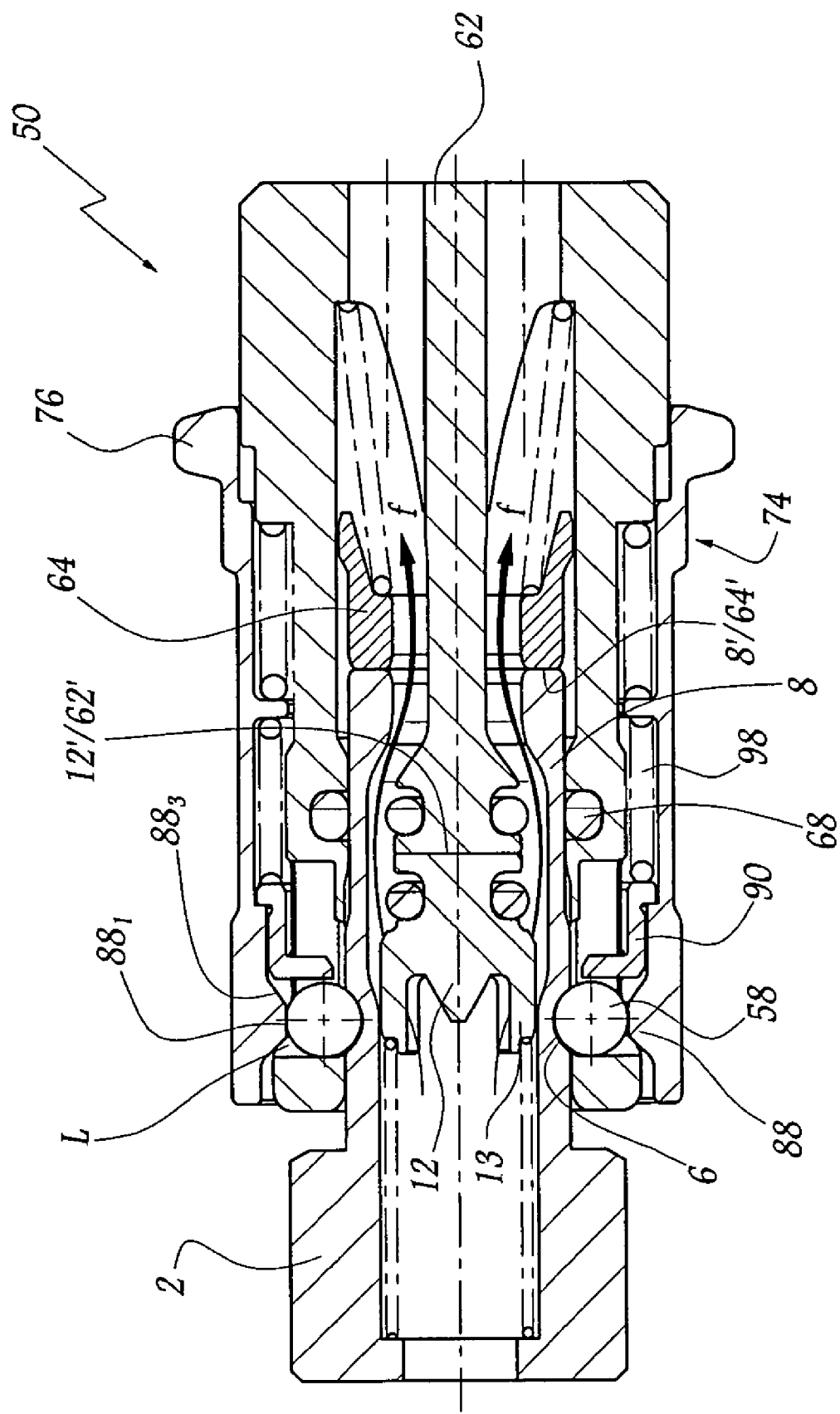
FIG. 3 is a side view showing the endpiece and the coupling member of FIG. 2 in their coupled-together position.

At the end of this movement, whereby the coupling member 50 moves closer to the endpiece 2, and as shown in FIG. 3, the locking balls 58 are to the right of the peripheral groove 6. The spring 98 which then encounters lower resistance, is suitable for driving the slider 90 axially, and consequently driving the balls 58. The balls then roll along the ramp $88_3$ of the projection 88 until they come against the land $88_1$ thereof, thus leading to the balls becoming locked in the groove 6.

The coupling member 50 and the endpiece 2 are then in the coupled-together position, as shown in FIG. 3. It should be observed that in this arrangement, the housing L again possesses minimum axial dimensions, as in the uncoupled configuration of FIG. 1. Fluid can then flow along arrows f between the fingers 13 and also through the intermediate spaces left between the branch 62 and the valve members 12 and 64.

Figure 4:
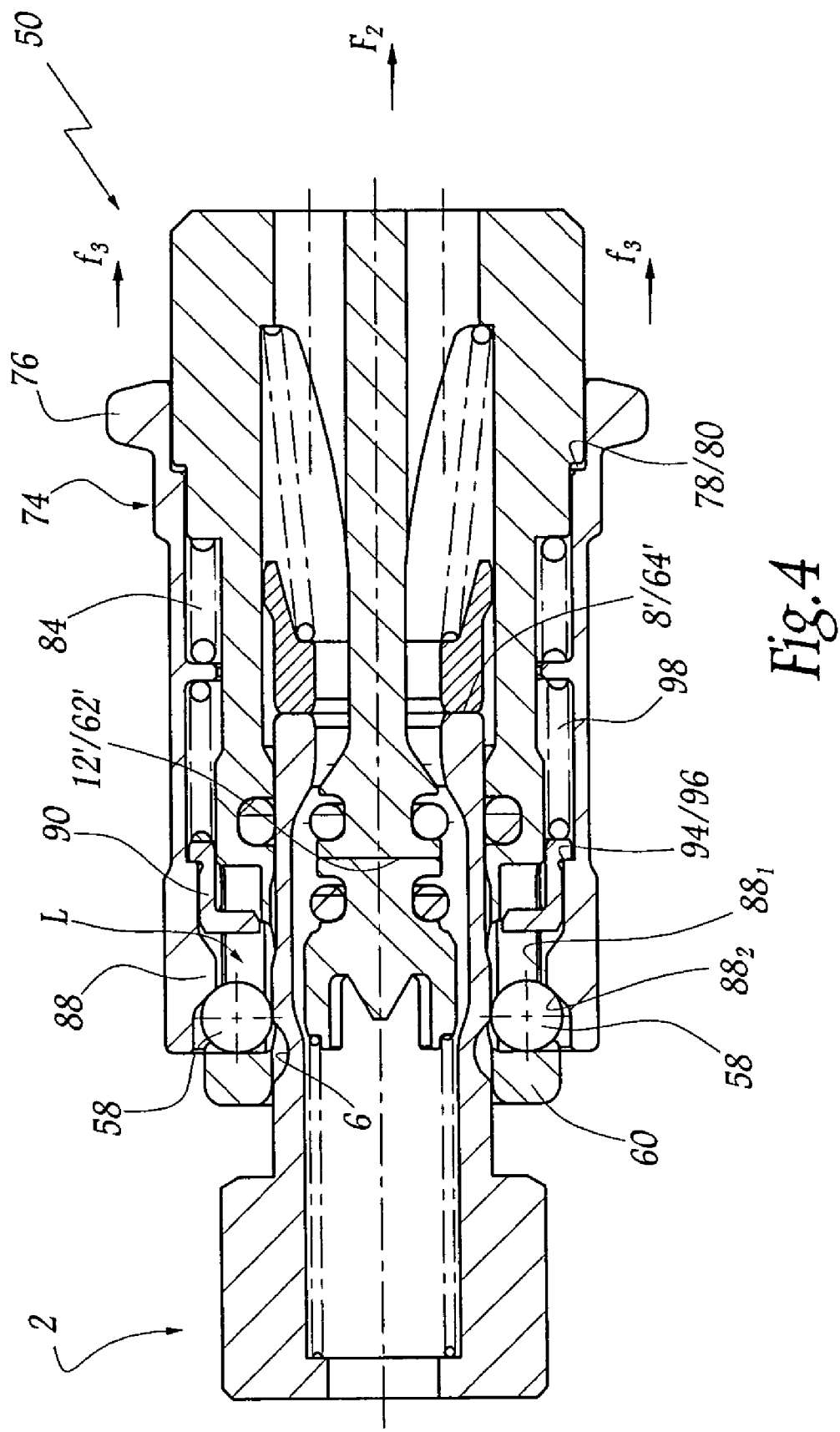
FIG. 4 is a side view, showing the stage of uncoupling the endpiece and the coupling member of FIGS. 2 and 3.

If it is desired to uncouple the endpiece 2 from the coupling member 50, then it is necessary to pull on the control sleeve 74 manually via its collar 76 against the spring 84 in the direction of arrows $f_3$ in FIG. 4.

This also causes the slider 90 to move axially, away from the ring 60, because of the presence of the shoulders 94 and 96. Consequently, the axial dimensions of the housing L are again increased, as in the coupling position shown in FIG. 2.

The projection 88 belonging to the sleeve 74 is also moved away from the ring 60 so that the balls 58 are no longer locked by the land $88_1$. The walls of the groove 6 then push the locking balls 58 radially outwards, so they roll over the land $88_1$ of the projection and then over its other ramp $88_2$. In this respect, it should be observed that this movement takes place in the opposite direction to that which occurs during coupling, as described with reference to FIG. 2. The balls 58 then occupy their unlocked position of FIG. 4, i.e. a radially outer position.

By continuing to act on the control sleeve 74, the operator then causes the coupling member 50 to slide manually relative to the endpiece 2 along arrow $F_2$ so that at the end of this movement the coupling member 50 and the endpiece 2 are uncoupled. It is then possible to release the traction being exerted on the sleeve 74 such that the sleeve returns to its rest position, as shown in FIG. 1, under drive from the return spring 84.

It should be observed that both during coupling and during uncoupling, the plane faces 8' and 12', and also the plane faces 62' and 64', come to bear flat against each other in pairs. The same applies to the cylindrical portion 8 which engages with little clearance in the bore formed in the vicinity of the gasket 68. This is particularly advantageous since any possibility of fluid becoming imprisoned is prevented during either of these operations. The plane and cylindrical surfaces which define substantially complementary volumes avoid creating any dead volume that would be suitable for generating drips or leaks during successive opening and closure operations performed on the coupling assembly in accordance with the invention.

The co-operation between the endpiece 2 and the plug 100 takes place in a manner that is generally analogous to that described above occurring between the endpiece 2 and the coupling member 50.

Thus, if it is desired to couple the endpiece 2 with the plug 100, the plug is moved up to the endpiece so that the free end 8' of the endpiece 2 pushes the balls 108 back axially and consequently pushes the slider 140 against the spring 148. Under such conditions, and as described above, the balls 108 are then in their unlocking position, corresponding to a radially extended configuration.

Thereafter it is possible to cause the plug to slide along the body 4 of the endpiece 2 until the O-ring 118 has been compressed and the endpiece comes close to the end wall 111 of the plug 100. The balls 108 are then in register with the groove 6, so that they penetrate therein under drive from the return spring 148 associated with the presence of the slider 140.

If it is desired to uncouple the plug, then it is necessary to pull on the sleeve 124 away from the endpiece 2 so that the projection 138 no longer locks the balls 108 in place. The balls can then move out from the groove 6 so that it is again possible to cause the plug 100 to slide along the walls 8 of the endpiece 2 in order to be withdrawn completely.

The invention is not limited to the example described and shown.

Thus, in this example, mention is made of an endpiece and of a coupling member each possessing a respective moving valve member for closure purposes. Nevertheless, in a variant, it is possible for only one of those two mechanical members to be fitted with such a valve member.

It is also possible to envisage that neither the endpiece nor the coupling member has a valve member for closure purposes. Under such circumstances, once the coupling member is coupled to the endpiece, said coupling member is put into communication with a fluid feed source so as to admit fluid into the endpiece.

The invention serves to achieve the above-mentioned objects.

The coupling member or the plug is particularly convenient for a user to couple and uncouple relative to the endpiece. Thus, during coupling, it suffices to move the coupling member or the plug axially towards the endpiece in an entirely natural movement. Uncoupling is accomplished solely by applying traction on the control sleeve of the coupling member or the plug, i.e. by performing an action that is likewise natural.

The presence of the sleeve return means interposed between the facing walls of the body of the coupling member and said sleeve is also advantageous, in particular while coupling the coupling member on the endpiece.

In this respect, it should be emphasized that while the coupling assembly in accordance with the invention is in use, it can be advantageous for the operator to take hold of the coupling not via the sleeve 74 but via its body 52. As a result, the coupling member is made more convenient to use for the operator, in particular insofar as the operator can place the coupling member in the most appropriate position relative to the disposition of the endpiece.

Under such conditions, the presence of these return means maintain the control ring in a determined position in spite of its weight which might cause it to move, so that the projection 88 fitted thereto is also in a well-defined position. In other words, the return means guarantee that whatever the orientation of the coupling member 50, the locking balls 58 are maintained reliably in the groove 6 by the projection 88.

In this respect, it should be observed that reliable locking is not necessarily ensured if the two springs 84 and 98 are replaced by a single spring extending between the shoulder 86 and the slider 90. In such a configuration, when the endpiece 2 pushes back the balls 58 and the slider 90 during coupling, the sleeve 74 is no longer subjected to the action of said single spring. Under such conditions, it is capable of moving axially in unwanted manner, in particular when it is subjected to the action of gravity. It will be understood that such untimely movement can be harmful to the quality of the operations performed on said coupling member.

It is also emphasized that the coupling assembly in accordance with the invention is not the subject of untimely uncoupling, in particular when traction is applied to the body 52 of the coupling member 50. This should be compared with the teaching of FR-A-2 708 078, in which such uncoupling can occur.

The coupling assembly in accordance with the invention is particularly adapted to installations that are difficult and relatively inaccessible, for example when cooling electronics cards or when the endpiece is to be found secured to the bottom of a well in which accessibility is reduced. It is possible to manipulate the coupling member or the plug even when the endpiece lies below the outlet from the well.

What is claimed is:

1. A coupling assembly for a fluid-flow circuit, the assembly comprising an endpiece for being secured to an outlet of the circuit, said endpiece being provided with means for receiving locking balls, the coupling assembly also including a coupling member for being selectively joined with said endpiece in a configuration where a fluid can flow between said coupling member and said endpiece as said endpiece and said coupling member are being axially inserted one within the other, said coupling member including:

a hollow body of a size to receive said endpiece therein and having an inlet opening surrounded by a ring which is integral with said body and which projects radially outwardly of the inlet opening;

at least one housing formed axially between said ring of said body and a slider that is axially movable over and relative to said body and radially between said body and a control member mounted surrounding said body and said slider, locking balls retained in said housing, said locking balls being radially and axially movable between a locked position that is radially inner relative to a main axis of the body such that said locking balls are seated within said means for receiving locking balls of said endpiece when said endpiece is inserted within said body and an unlocked position that is radially outer relative to said main axis such that said locking balls are not seated within said means for receiving locking balls of said endpiece as said endpiece is being insert into and removed from said body, said housing being axially adjustable in size and being axially smaller so as to closely confine said locking balls between said ring of said body and said slider and within said means for receiving locking balls of said endpiece when said locking balls are in their locked position and being axially larger so as to space said locking balls from said ring of said body as said endpiece is inserted within said body and said locking balls are moved inwardly of said body;

said slider having a radially extending wall defining an axially movable end of said housing, said slider being slidably movable generally parallel to said main axis between an advanced position in which said radially extending wall imparts the smaller axial size to said housing and in which the locking balls are blocked in their locked position by a locking element of said control member, and a retracted position in which said radially extending wall of said slider imparts the larger axial size to said housing and said locking balls are moved inwardly of said body and spaced from said ring of said body so as to be between said locking element of said control member and said slider, and wherein said radially extending wall of said slider defines said one end of said housing in both the advanced position and the retracted position of said slider, and wherein said radially extending wall is closer to the inlet opening into said hollow body when said slider is in the advanced position than when in the retracted position;

said control member being movable between a forward rest position in which it and said slider in its advanced position, retain said locking balls in said inner locking position and seated within said means for receiving locking balls of said endpiece, and a second rearward position in which said control member comes into abutment against a portion of said body that in use faces towards said endpiece and in which second rearward position said locking balls are out of said locked position and in said unlocked position spaced between said ring of said body and said locking element of said control member and spaced from said slider; and return means for returning said control member towards its rest position, said return means being interposed between facing walls belonging respectively to said body and to said control member.

2. The coupling assembly according to claim 1, wherein said return means of said control member includes at least one spring.

3. The coupling assembly according to claim 1, the assembly being further provided with second return means for returning said slider to its advanced position.

4. The coupling assembly according to claim 3, wherein said second return means is interposed between facing walls of said slider and said control member.

5. The coupling assembly according to claim 4, wherein said return means of said control member and said second return means of said slider are in alignment with each other.

6. The coupling assembly according to claim 5, wherein said return means of said control member and said second return means of said slider are resilient, a stiffness of said return means of said control member being greater than a stiffness of said second return means of said slider.

7. The coupling assembly according to claim 6, wherein said control member includes a middle rib projecting radially inwards, said return means for said control member being interposed between said rib and a shoulder portion of said body of said coupling member, said second return means of said slider being interposed between said rib and said slider.

8. The coupling assembly according to claim 1, wherein said endpiece includes a movable valve member for being moved by a stationary portion of said coupling member, and said coupling member has a movable valve member for being moved by a stationary portion of said endpiece.

9. The coupling assembly according to claim 8, wherein, when said endpiece and said coupling member are separated, their respective stationary portions and their respective movable valve members together define respectively, in said endpiece and in said coupling member, planar facing surfaces for bearing flat one against another.

10. The coupling assembly according to claim 1, wherein said coupling assembly further includes a plug for co-operating with said endpiece when said endpiece is not joined to said coupling member, said plug including:

a second body having a closed end wall that is remote in use from said endpiece;

at least one second housing formed in said second body, said second housing retaining second locking balls that are movable between a locked position, radially towards an inside of said second housing, and an unlocked position, radially towards an outside of said second housing;

a second slider defining a radially extending end wall of said second housing, said second slider being movable between an advanced position in which said radially extending end wall thereof imparts a small axial size to said second housing, and in which said second locking balls are locked in their locked position by a second locking element of said second body, and a retracted position in which said radially extending end wall thereof imparts a larger axial size to said second housing;

a second control member provided with said second locking balls, said second control member is movable between a first position in which it and said second slider, when said second slider is in its advanced position, retain said second locking balls within said second housing, and a second position in which it abuts a portion of said second body that faces towards said endpiece in use; and another return means for returning said second control member into its second position, said another return means being interposed between facing walls of said second body and of said second slider.

11. The coupling assembly according to claim 1 wherein said locking balls seat within spaced slots in said body of said coupling member when in their locked position and before said endpiece is inserted within said coupling member.

12. The coupling assembly according to claim 1 wherein said control member is a frustoconical projection having a locking land for cooperatively engaging said locking balls when said locking balls are in their locked position.

13. The coupling assembly of claim 1 wherein said locking element of said control member is a radially inwardly extending projection for blocking outward radial movement of said locking balls when in their locked position.

14. the coupling assembly of claim 1 wherein said locking balls are axially movable along open slots in said body.

* * * * *